Patented Nov. 29, 1938

2,138,031

UNITED STATES PATENT OFFICE 2,138,031

AMINO ALCOHOL ACRYLATES

George D. Graves, Wilmington, Del., assignor to E. I. du Pont de Nemours & Company, Wilmington, Del., a corporation of Delaware No Drawing. Application September 25, 1935, Serial No. 42,054. In Germany June 18, 1935

7 Claims. (Cl. 260—2)

The present invention relates to new compositions of matter and to processes for their preparation. More specifically, it relates to the polymeric acrylic acid esters of the amino alcohols in which the amino group is tertiary and to various processes for the preparation of these esters. Whenever the term "amino alcohols" is used hereinafter, the amino alcohols in which the amino group is tertiary, will be meant.

An object of the present invention is to provide new compositions of matter and processes for their preparation. A further object of the invention is to provide polymeric amino alcohol esters of acrylic acid together with processes for their preparation. Another object of the invention is to provide mixtures or interpolymers of the polymeric amino alcohol esters of acrylic acid with other polymerizable compounds and more particularly with those of methacrylic and acrylic acids. Other objects and advantages of the invention will hereinafter appear.

The monomeric amino acrylates may be prepared by reacting an acrylyl halide with an amino alcohol or with an alkali metal or an alkaline earth metal amino alcoholate, under suitable conditions, as, for example, in the presence of a polymerization inhibitor for the ester formed, and in the presence of a suitable inert solvent for such esters such as benzene, toluene, dioxan, etc. Acrylyl chloride may be prepared by the method of Moureau, Ann. Chim. Phys. (7), 2, 158 (1894).

The following examples are given to illustrate the invention, but it will be understood that the invention is not limited by the details therein given except as indicated by the appended claims. These examples illustrate the preparation of salts of the monomeric esters and the free base monomers therefrom. Examples 1 and 2 show, in addition, the preparation of polymeric salts and free base polymers.

EXAMPLE 1

*Beta-dicyclohexylaminoethyl acrylate*

*Monomer.*—To a solution of 6.5 g. (0.072 mole) of acrylyl chloride in 30 cc. of dry benzene, there was added 16 g. of beta-dicyclohexylamino ethanol (0.071 mole) in 50 cc. of dry benzene. The mixture was allowed to stand overnight at 10–20° C. Crystals of beta-dicyclohexylaminoethyl acrylate hydrochloride separated out and were filtered and dried in a vacuum desiccator. The yield was 22 g., or 98% of the theory. The free base monomer is obtained by treating the salt with ammonia.

*Polymer.*—The salt obtained above was dissolved in 88 g. of water and mixed with 0.22 g. of benzoyl peroxide. The mixture was then heated at 100° C. for 87 hours in a closed flask. A thin syrupy solution resulted which was filtered and precipitated with 20 cc. of 28% ammonia water. After the water had been decanted from the precipitate, which was a semi-fused, white, slightly sticky mass, it was purified by kneading with water. The resin was soluble in toluene and hot butyl acetate but insoluble in acetone and ethanol. The wet resin was dissolved in 20 g. of glacial acetic acid by warming and stirring, and the solution was diluted with water until the weight was 200 g. This solution was a thin syrup and contained 6.18% resin corresponding to a yield of 12.36 g. resin, or 63% of the theoretical. A film flowed from the acid solution was, after being baked at 100° C. for 21 hours, hard, fairly tough, not readily affected by water but readily dissolved by 30% acetic acid.

EXAMPLE 2

*1-(beta-acrylyloxyethyl) piperidine*

*Monomer.*—To a solution of 16.5 g. (0.182 mole) of acrylyl chloride dissolved in 50 cc. of dry benzene, there was added 23.5 g. (0.182 mole) of (beta-hydroxyethyl) piperidine dissolved in 75 cc. of dry benzene. Much heat was evolved and white crystals of 1-(beta-acrylyloxyethyl) piperidine hydrochloride soon separated. The mixture was cooled, filtered and dried in a vacuum desiccator. The yield of this very hygroscopic salt was 37.5 g., or 93% of the theoretical. The free base monomer is obtained by adding aqueous sodium bicarbonate to the salt.

*Polymer.*—The above salt was dissolved in 150 g. of water; 0.37 g. of benzoyl peroxide was added; the flask was closed, and the mixture was heated in a 100° C. oven for two days. The very thin syrupy solution which resulted was filtered and treated with 80 g. of 50% aqueous potassium hydroxide. A soft sticky resin precipitated and the water layer was decanted from it. The resin was soluble in 95% ethanol, 80% aqueous acetone, and 80% aqueous dioxan. It was readily soluble in water to give a clear solution. The main portion of the resin was dissolved in 100 cc. water, 10 g. of acetic acid were added, and the solution was diluted to 200 g. This solution contained 14.6% solids which corresponds to 29 g. of resin, or 89% of the theoretical yield.

EXAMPLE 3

*Monomeric beta-diethylaminoethyl acrylate*

Nine grams of acrylyl chloride dissolved in 50 cc. of dry benzene was treated with 12 g. of diethyl aminoethanol in 50 cc. of dry benzene. When the mixture was cooled, filtered, and the product dried in a vacuum desiccator, there was obtained 15 g. of beta-diethylaminoethyl acrylate hydrochloride which was equal to a yield of 80% of the theoretical. The free base monomer is obtained by adding to an aqueous solution of the salt until alkaline an aqueous solution of sodium hydroxide.

As an alternative and highly useful procedure for polymerizing the free base monomer of this invention, the monomeric ester may be emulsified in a suitable non-solvent with the aid of a suitable dispersing agent, e. g. the potassium or sodium salt of an alkyl-naphthalene sulfonic acid, the sodium or potassium salts of the acid sulfates of the alcohols obtained by carboxyl hydrogenation of fatty oils, sodium or potassium oleate, sodium or potassium resinate, etc., and then subjecting the emulsion to polymerizing conditions with or without the aid of a suitable polymerization catalyst. The polymer may be recovered from these emulsions either by coagulation with an inorganic salt such as sodium chloride, calcium chloride and the like, or by evaporation of the dispersing medium. When polymerized in this manner the resins are soluble in many organic solvents.

Interpolymers and copolymers may be made either by first mixing the ester with other polymerizable compounds, e. g. vinyl esters, styrene, butadiene, chloro-2-butadiene-1, 3, indene, acrylic and methacrylic acid esters, drying, semi-drying, and non-drying oils, natural and synthetic resins, etc., and subsequently polymerizing the mixture, or by ester interchange between an amino alcohol and a polymeric ester, e. g. polymeric ethyl acrylate, methyl acrylate, etc.

The temperature and time of reaction may be varied over wide limits, but generally it is preferred to synthesize these esters at as low a temperature as practical in order to avoid either decompositions or polymerization of reactants or products. The particular time and temperature of reaction will vary both with the method of preparation and the nature of the reactants. As previously indicated it is advisable to synthesize in the presence of an inhibitor of polymerization for the ester, and among suitable inhibitors are hydroquinone, p-phenylenediamine, pyrogallol, tannic acid, sulfur, selenium, cuprous chloride, benzidine, etc.

The amino alcohols used in the practice of this invention are tertiary amines containing at least one primary, secondary or tertiary alcoholic hydroxyl group. The amino nitrogen may carry alkyl, aryl, aralkyl, or cyclo-paraffin groups or it may form a part of a ring which may consist of carbon atoms only or which may be heterocyclic in nature. Examples of suitable alcohols are beta-diphenylaminoethanol, beta-diisopropyl-aminoethanol, beta-di-n-propylaminoethanol, beta-di-n-dodecylaminoethanol, gamma-diethylaminopropanol, delta-diethylaminobutanol, delta-dibutylaminobutanol, delta-diisobutylaminobutanol, beta-di-isobutylaminoethanol, beta-(N-methyl-N-cyclohexylamino)ethanol, trimethanolamine, tributanolamine, tripropanolamine, triisobutanolamine, N-octyl-N-methylglucamine, dimethylglucamine, 1-(beta-hydroxyethyl)decahydroquinoline, 1-(beta-hydroxyethyl)piperazine, 1-(beta-hydroxyethyl)monoalkylpiperazines, 2-hydroxy-4-alkyl-morpholines, diesters and diethers of triethanolamine, beta-hydroxy-beta-dialkyldiaminodiethyl ethers and analogous compounds from tri- and tetra-ethylene glycol.

Additional amino acrylates may be prepared in accord with the processes described in the examples, e. g., beta-propylaminoethyl acrylate, 4-(beta-acrylyloxyethyl)morpholine, and beta-dicyclohexylaminoethyl acrylate. In the case of polyhydric amino alcohols, all or only a portion of the hydroxyl groups may be esterified with acrylic acid, depending on the amount of the latter used.

The polymeric salts of this invention are highly useful for fixing water-proofing materials such as waxes to textiles. Aqueous emulsions containing paraffin and the polymeric acetate of beta-dicyclohexylaminoethyl acrylate or 1-(beta-acrylyloxyethyl)piperidine are specifically very valuable for this purpose. The polymeric salts are also suitable as adhesives for general use. The free base polymers are useful as ingredients of coating and plastic compositions, which may if desired contain other substances normally used therein, such as oils, cellulose derivatives, other resins, plasticizers, solvents, pigments, and the like.

From a consideration of the above specification it will be appreciated that many improvements may be made in the processes hereinbefore described without departing from the scope of the invention.

I claim:

1. Polymeric beta-diethylaminoethyl acrylate.
2. As a new composition of matter a lacquer composition containing a polymeric acrylic acid ester of an amino alcohol in which the amino nitrogen is tertiary.
3. As a new composition of matter a lacquer composition containing a polymeric acrylic acid ester of a substituted amino alcohol in which the amino nitrogen is tertiary.
4. Polymeric beta-dicyclohexylaminoethyl acrylate.
5. An interpolymer of an acrylic acid ester of an amino alcohol in which the amino nitrogen is tertiary with a polymerizable ester of an acid selected from the group consisting of acrylic acid and methacrylic acid.
6. A process for the preparation of polymeric beta-diethylaminoethyl acrylate which comprises dissolving the acid salt of beta-diethylaminoethyl acrylate in water containing benzoyl peroxide, polymerizing the salt by heat and subsequently neutralizing the resulting polymeric acid salt to obtain the free base polymer of beta-diethylaminoethyl acrylate.
7. A polymeric acrylic acid ester of an amino alcohol in which the amino nitrogen is tertiary.

GEORGE D. GRAVES.

CERTIFICATE OF CORRECTION.

Patent No. 2,138,031. November 29, 1938.

GEORGE D. GRAVES.

It is hereby certified that error appears in the printed specification of the above numbered patent requiring correction as follows: Page 1, second column, line 35, for "(beta-hydroxyethyl) piperidine" read 1-(beta-hydroxyethyl) piperidine; and that the said Letters Patent should be read with this correction therein that the same may conform to the record of the case in the Patent Office.

Signed and sealed this 10th day of January, A. D. 1939.

(Seal)

Henry Van Arsdale
Acting Commissioner of Patents.